United States Patent [19]

Despouys

[11] Patent Number: 4,869,572

[45] Date of Patent: Sep. 26, 1989

[54] CONNECTOR FOR OPTICAL FIBRES AND A METHOD OF PRODUCING IT

[75] Inventor: Jean B. Despouys, Paris, France

[73] Assignee: Radiall Industrie, Rosny-Sous-Bois, France

[21] Appl. No.: 366,707

[22] Filed: Apr. 8, 1982

[30] Foreign Application Priority Data

Apr. 9, 1981 [FR] France ................................ 81 07144

[51] Int. Cl.⁴ .............................................. G02B 6/38
[52] U.S. Cl. .................................................. 350/96.21
[58] Field of Search ...................................... 350/96.21

[56] References Cited

U.S. PATENT DOCUMENTS

| 3,982,815 | 9/1976 | Nakayama | 350/96 C |
| 4,320,938 | 3/1982 | Gunnerson et al. | 350/96.21 |
| 4,330,171 | 5/1982 | Malsot et al. | 350/96.21 |

FOREIGN PATENT DOCUMENTS 54-1647 1/1979 Japan .
2058392 4/1981 United Kingdom .

OTHER PUBLICATIONS

Review of Electrical Comm. Laboratories, 418, vol. 27 (1979), Nov., Dec., No. 11-12, "Demountable Connectors for Optical Fiber Transmission Equipment".

*Primary Examiner*—William L. Sikes
*Attorney, Agent, or Firm*—Arnold, White & Durkee

[57] ABSTRACT

A connector for optical fibres including two male ferrules mounted at the end of each of the fibres which are to be connected and a female reconstituting connector having a longitudinal bore for supporting and aligning the two ferrules face to face.

The female connector has in the central portion of it inside its longitudinal bore an abutment body for the male connectors, which exhibits an axial orifice passing through it and round the latter a bearing surface opposite each of the male ferrules, each of the male ferrules exhibiting a tubular axial protuberance capable of engaging in the orifice in the said body and a passage into which the optical fibre may be introduce with clearance and sealed in such a way that the end of it coincides with the end of the said protuberance, each of the ferrules including in addition, set back from the said protuberance and surrounding the rear portion of it, an annular recess the wall of which defines a bearing surface for contact with the opposing bearing surface on the body of the female connector.

8 Claims, No Drawings

CONNECTOR FOR OPTICAL FIBRES AND A METHOD OF PRODUCING IT

The present invention relates to a connector for optical fibres.

At present the connection of two optical fibres is generally effected by means of connectors formed of two male ferrules mounted at the ends of each of the fibres and of a female reconstituting connector having a longitudinal bore for supporting and aligning the two ferrules face to face.

It is known that in order to obtain a good connection with low losses it is necessary that the connector align the two fibres perfectly. In order to ensure this alignment the ferrules are positioned in the bore in the connector, bearing by their sidefaces by applying transverse forces. Longitudinal fixing of the ferrules necessitates in addition the application of longitudinal forces.

The technological solutions for achieving such connectors whilst proportioning as well as possible the longitudinal and transverse forces which have to be brought into play, are complicated and incompatible with the achievement of effective connectors at reasonable cost. Moreover the contact pressures between the male ferrules and the female connector cause wear to occur during the course of the manipulations of coupling and uncoupling. The phenomena of wear progressively alter the alignment of the fibres and may be the source of pollution of the optical faces. Again, these wear phenomena limit the length of life of the connectors.

The present invention is aimed at alleviating the disadvantages of the connectors known at present, by providing a connector of high accuracy, which enables interchangeable optical connections to be carried out by bringing into play solely longitudinal forces for the alignment and positioning of the male ferrules in the female connector. The present invention further proposes to supply a connector capable by particularly simple means, of ensuring simultaneously an attenuation function of predetermined attenuation.

For this purpose it is an object of the present invention to provide a connector for optical fibres, characterized by the fact that the female connector has in the central portion of it inside its longitudinal bore an abutment body for the male ferrules, which exhibits an axial orifice passing through it and round the latter a bearing surface opposite each of the male ferrules, each of the male ferrules exhibiting a tubular axial protuberance capable of engaging in the orifice in the said abutment body and a passage into which the optical fibre may be introduced with clearance and fixed in such a way that the end of it coincides with the end of the said protuberance, each of the ferrules including in addition, set back from the said protuberance and surrounding the rear portion of it, an annular recess the wall of which defines a bearing surface for contact with the opposing bearing surface of the abutment body in the female connector under the action of longitudinal pressure-means, the opposing bearing surfaces of the said abutment body and of each of the male ferrules being arranged in such a way that at the time of any relative movement of the bearing surfaces in contact the end of a fibre at the level of the endface of the protuberance from a male ferrule is kept at a constant predetermined distance from the centre of the said abutment body.

In a first embodiment the abutment member in the female connector is a sphere, the annular recess in each male ferrule exhibiting a wall of conical profile.

As a variant upon this embodiment the sphere may be replaced by a disc of the same diameter, supplementary positioning means having to be provided in order to ensure the angular alignment of each male ferrule with respect to the female connector.

In a second embodiment the abutment body is cylindrical, the annular recess in each male ferrule exhibiting a wall of spherical profile, the cylindrical body coming to bear against the spherical bearing surfaces of the male ferrules at the periphery of its plane endfaces, the spherical bearing surfaces being arranged in such a way that the spherical bearing surfaces of the two ferrules in the coupling position define a sphere the centre of which coincides with the centre of the cylindrical abutment body.

In another embodiment the abutment body is parallelepipedal, the annular recess in each male ferrule exhibiting a wall of spherical or conical profile. The angular alignment of a male ferrule with respect to the female connector may be ensured, for example, by conferring corresponding polygonal cross-sections upon the protuberances from the male ferrules and upon the axial orifice in the abutment body.

If it is desired to confer upon the connector thus realised a capacity of attenuation, so as to add an attenuation function, it will be understood that it is sufficient to modify the dimensioning of the spherical alignment body in the first embodiment or the radius of the spherical bearing surface of each male ferrule in the second embodiment, in order to move away from the centre of the abutment body the ends of the fibres held at the level of the ends of the protuberances from the male ferrules. This solution is particularly interesting when the connector is employed in an installation in which it is desired to bring the signal to a predetermined level.

The present invention has likewise as an object a method of production of a connector such as that described above, characterized by the fact that an optical fibre is put into position in a jig which includes an abutment piece exhibiting the form of half an abutment body from a female connector, that the said fibre is centred with respect to the said abutment piece and to a male ferrule put into position in the said jig, that the fibre so centred is fixed in the ferrule being held in the said jig, that the ferrule is then brought into a second jig which includes an abutment piece exhibiting the form of half an abutment body from a female connector, that the ends of the fibre and of the said ferrule are cut off and polished at a predetermined distance from the centre of the abutment piece of the second jig and that two so produced are put into position in a female connector until the opposing bearing surfaces of each ferrule and of the abutment body of the female connector are brought into contact.

In one way of implementing the method, in order to carry out the stage of centreing a fibre with respect to a male ferrule, a male ferrule is arranged in a jig which includes a front portion exhibiting the form of half a female connector, a central portion including an abutment piece exhibiting the form of half an abutment body from a female connector and a rear fibre-centreing portion which preferably includes a cavity the shape of a re-entrant dihedron, an optical fibre is arranged in the axial passage in the ferrule and the optical fibre is centred with respect to the ferrule in the rear portion of the jig, in particular whilst keeping it at the bottom of the said re-entrant dihedron of the jig by means of a corresponding wedge. Once the fibre has been centred with respect to the male ferrule in the jig, one proceeds to fixing it in the ferrule, advantageously by injection of a resin through an orifice provided for this purpose in the front portion of the jig, the fibre thus centred becoming sealed in the ferrule upon hardening of the resin.

A jig is advantageously employed, which consists of three portions which can be fitted together, namely: a front portion exhibiting the form of half a female connector, a central portion including an abutment piece exhibiting the form of half an abutment body from a female connector and a rear fibre-centreing portion which preferably includes a cavity the shape of a re-entrant dihedron, and a preadjustment of the jig is carried out, which consists in putting an optical fibre in place in the rear portion of the jig, in fitting onto the said rear portion the central portion including the abutment piece, in centreing the said abutment piece with respect to the optical fibre by optical aiming, in particular by means of an autocollimating telescope, whilst moving the central and rear portions of the jig with respect to one another in contact with one another, and in putting the front portion of the jig in place on the central portion of it.

As a variant a one-piece jig may be employed.

The present invention has likewise as its object a second way of implementing the method of production of a connector having the aforesaid characteristics, characterized by the fact that an optical fibre is introduced into a male ferrule and fixed by mechanical locking means, that the end of the fibre is positioned axially with respect to the male ferrule by introducing the whole into a jig which includes an abutment piece exhibiting the form of half an abutment body from a female connector, that the ends of the fibre and of the ferrule are cut off and polished at a predetermined distance from the centre of the abutment piece on the jig, that the ferrule equipped with the optical fibre is put in position in a second jig exhibiting the form of half a female connector and including an abutment piece which exhibits the form of an abutment body from a female connector, that the optical fibre is centred with respect to the said abutment piece by optical aiming, in particular by means of an autocollimating telescope, whilst acting upon the said mechanical locking means, and that two male ferrules so produced are put into position in a female connector until the opposing bearing surfaces of each ferrule and of the abutment body of the female connector are brought into contact.

The means of mechanical locking advantageously include a plurality of metal balls seated in holes in the male ferrule by force and capable of being applied against a central metal tube which includes a recess in which the fibre is fixed, in particular by gluing, the said metal tube creating the tubular axial protuberance from the male ferrule.

Other advantages and characteristics of the invention will be revealed in the description which follows with reference to the attached drawing in which:

FIG. 1 represents partially in section a first embodiment of the connector in accordance with the invention;

FIG. 2 represents partially in section a second embodiment of the connector in accordance with the invention;

FIG. 3 is a section through a first embodiment of a jig for putting into position and centreing a fibre in a male ferrule of a connector of the embodiment as FIG. 1;

FIG. 4 is a section along IV—IV in FIG. 3;

FIG. 5 illustrates the second phase of preparation of this male ferrule, in accordance with a first way of implementation;

FIG. 6 illustrates the end of the male ferrule ready for being introduced into the female connector;

FIG. 7 represents a second embodiment of a jig which may be employed for putting into position and centreing a fibre in a male ferrule of a connector of the embodiment as FIG. 1;

FIG. 8 represents very diagramatically an autocollimating telescope which may be employed for preadjustment of the jig as in FIG. 7;

FIG. 9 illustrates the phase of preadjustment of the jig as FIG. 7, employing the telescope as FIG. 8;

FIG. 10 illustrates the image seen in the eyepiece during the phase of preadjustment of the jig as FIG. 7;

FIG. 11 is a view similar to that of FIG. 3, employing the jig as FIG. 7;

FIG. 12 is a section through a variant upon the jig illustrated in FIG. 5, for the second phase of preparation of a male ferrule;

FIG. 13 is a section through a variant embodiment of a male ferrule for the production of the connector in accordance with the invention;

FIG. 14 is a section along XIV—XIV in FIG. 13;

FIG. 15 illustrates the phase of centreing of a fibre in a male ferrule as in FIG. 13, employing the telescope as FIG. 8;

FIG. 16 illustrates the image seen in the eyepiece of the telescope during the phase of centreing illustrated in FIG. 15.

The connector represented in FIG. 1 includes in general two male ferrules (1) arranged in a female connector (2) having a central flange (3) provided with holes (4) for attachment of it to a panel.

The male ferrules (1) are arranged in a longitudinal bore (5) in the female connector and are locked in it by means of rings (6) the threads (7) in which cooperate with corresponding threads (8) on the ends of the female connector (2).

In the longitudinal bore (5) in the female connector, in the central zone of it at the level of the flange (3), there is located a sphere (9) equipped with an axial orifice (10) passing through it, which is cylindrical in the example illustrated.

The sphere may advantageously be a steel ball ground and drilled, such a ball being able to be produced industrially with tolerances on the diameter and sphericity less than one micrometre. The sphere is fixed by any suitable means, for example, by crimping or shrinking onto the inner wall of the female connector in the central zone of it.

It is likewise possible in the case of less effective connections, to produce the sphere in only one piece with the female connector, by conventional techniques of casting or die-stamping.

Each of the male ferrules (1) exhibits a tubular axial protuberance (11) at the front end of which an axial passage (12) opens out, inside which an optical fibre (13) has been sealed by means of a resin (14). The optical fibre (13) is fixed in the ferrule by the resin (14) and channeled at the rear of the ferrule by a tubular cable (15).

Each of the male ferrules (1) exhibits, set back from the tubular protuberance (11), an annular recess exhibiting a wall of the cavity of conical shape (16).

It may be seen in FIG. 1 that the frustoconical bearing surface (16) thus defined on each ferrule, is in contact with a spherical bearing surface on the sphere (9), the contact pressure being maintained by compression springs (17) arranged between each ferrule and the corresponding locking ring (6).

It will be understood that because of the shape of the bearing surfaces in contact, the one frustoconical on the ferrule and the other spherical on the sphere (9), it is ensured that the end (13a) of each optical fibre at the level of the endface of the protuberance (11) from each of the male ferrules is constantly maintained at a predetermined fixed distance from the centre of the sphere (9), where this distance may be kept very small, even zero if end-to-end contact of the fibres is desired. If, for example, the diameter of the sphere (9) is increased, the distance of the end (13a) of each fibre from the centre of the sphere is increased, thus offering a capacity of attenuation. Hence the value of the attenuation is easily determined as a function of the diameter of the sphere employed.

Because of the high accuracy that may be obtained in the dimensional characteristics of the sphere, as recalled above, it is not necessary to observe excessive accuracy at the level of the frustoconical bearing surfaces of the male ferrules, an accuracy of a few degrees in the angles of the cones being sufficient. Similarly it is not necessary to observe very high accuracy at the level of the cylindrical portions of the male ferrules and of the female connector, an accuracy of the order of 0.1 millimetres being sufficient.

A connector produced in accordance with the invention offers in addition the advantage of great insensitivity to shock, the operational coupling faces, namely, the opposing bearing surfaces on the male ferrules and on the sphere of the female connector being protected. Moreover there is practically no friction at the time of manipulations of coupling or uncoupling, whence negligible wear and a satisfactorily long life of the connectors during the course of use.

Again, sealing of the connector is easy to effect.

Although there has been represented in the embodiment as FIG. 1 an optical connector having only one fibre, it is quite obvious that the same principle of connection may be employed for optical cables having a number of fibres and similarly a number of ferrules may be located in one and the same connector.

The axial orifice (10) in the sphere (9) in the embodiment having a sole fibre is advantageously cylindrical for reasons of ease of machining. However, this orifice (10) may exhibit any form, in particular polygonal, and include, for example, a re-entrant dihedron when it is desired seeking to ensure a complementary function of angular alignment of the ferrules, especially when the sphere (9) is replaced by a disc of the same diameter, arranged in such a way that in longitudinal section one meets again the arrangement as FIG. 1.

Reference will now be made to FIG. 2 which illustrates a second embodiment of the connector in accordance with the invention, portions identical with those of the connector as FIG. 1 bearing the same reference numbers.

In this embodiment the sphere (9) of the first embodiment is replaced by a cylinder (18) having an axial orifice (19) passing through, the recess in each of the ferrules (1) exhibiting in this embodiment a wall of spherical profile (20).

Reference will now be made to FIGS. 3 to 6 which illustrate the preparation of a male ferrule before the positioning of it in a female connector, in order in accordance with a first way of implementation, to produce the connector illustrated in FIG. 1.

In FIG. 3 may be seen the ferrule (1) equipped with its locking ring (6) put into position inside a first jig made in one piece, including a front portion (21a), a central portion (21b) and a rear portion (22). The front portion (21a) reproduces the characteristics of half a female connector intended for cooperating with the male ferrule and is extended by a central portion (21b) including a hemisphere (23) of the same size as the sphere (9) of the connector, equipped with an axial orifice (24), the relative arrangement of the ferrule in the jig reproducing identically the conditions of the subsequent coupling of the ferrule into the connector, the frustoconical bearing surface (16) being fitted against the corresponding bearing surface of the hemisphere (23) under the action of the compression spring (17).

The rear portion (22) of the jig, as may be seen better in FIG. 4, includes a cavity in the form of a re-entrant dihedron (25) in which a wedge-shaped piece (26) may come and engage.

The structure of the jig is such that when an optical fibre (13) is lying at the bottom of the cavity (25) under pressure from the wedge (23), it is perfectly centred with respect to the frustoconical bearing surface on the ferrule and to the hemisphere (23) in the central portion of the jig (21b).

Hence it is sufficient, in order to obtain the centreing of the fibre in the ferrule, to position a fibre in the ferrule which has been immobilised in the jig and to apply the piece (26) so as to bring the fibre (13) in the portion (22) of the jig, to the bottom of the groove (25). One then proceeds to injection of resin through a funnel-shaped orifice (27) arranged for this purpose in the front portion of the jig (21a), this orifice being aligned with an orifice (28) in the male ferrule.

The ferrule in which the fibre (13) has been sealed by the resin (14) is then arranged in a jig (29) which, as may be seen in FIG. 5, exhibits the same characteristics as the front portion (21) of the jig illustrated in FIG. 3. Once the ferrule has been held in the jig (29), in the same way as it was held in the front portion (21a) of the jig as FIG. 3, one proceeds to cutting off and polishing by means of an abrasive grindstone (30) which makes the optical fibre (13) and the end of the protuberance (11) from the male ferrule (1) flush in such a way that the end of the fibre is lying in a transverse plane at a predetermined distance of, for example, from a few micrometres to some tens of micrometres, depending upon the size of the fibre to be connected and the attenuation admissible in the connection, to the rear of the centre of the hemisphere provided in the jig (29).

This arrangement is illustrated in FIG. 6 which represents the completed ferrule and in which there has been shown diagramatically in dotted line, firstly the sphere on the female connector and secondly the diametral transverse plane through the latter, parallel with the end of the protuberance (11) and hence with the end (13a) of the optical fibre.

In practice, when very low attenuation is desired, the distance between the end (13a) of the fibre and the centre of the sphere is from 0.01 to 0.05 times the diameter of the heart of the fibre.

In order to assemble the connector it is sufficient to put into place in a female connector two male ferrules such as those illustrated in FIG. 6 until the configuration as FIG. 1 is obtained, in which the frustoconical bearing surfaces of the male ferrules are in contact with the spherical bearing surfaces of the sphere mounted inside the female connector.

The jig illustrated in FIG. 7 exhibits as a whole a structure very similar to that of the jig illustrated in FIG. 3, with the exception of the fact that its various components are distributed into three separable portions, namely, a front portion (21a) exhibiting the form of half a female connector, a central portion (21b) including an abutment piece exhibiting the form of half an abutment body on a female connector — in the case shown, a hemisphere (23) equipped with an axial orifice (24) — and a rear portion (22) including a cavity in the form of a re-entrant dihedron (25). Orifices (31) are provided in the three portions of the jig for passing through locking rods which enable the three portions of the jig to be fixed in position.

The jig in the assembled state is illustrated in FIG. 11, the parts which are identical with or have a similar function to those of the jig as FIG. 3 bearing the same reference numbers. In order to ensure preadjustment of such a jig one employs an autocollimating telescope (32) such as that illustrated in FIG. 8.

The latter includes an eyepiece (33), an eyepiece graticule (34), a lamp (35) the light from which passes through a condenser (36), a source graticule (37), a separator (38) and an objective (39).

Besides these components which are the components of a traditional autocollimating telescope, in accordance with the invention the idea is foreseen of arranging in front of the objective of the telescope an objective (40) similar to a microscope objective. This objective (40) has the function of causing the parallel rays arriving from the objective (39), to converge at its focus outside the telescope.

Thus if one places at the focus of the objective (40) the centre of a spherical ball the surface of which reflects, the image of the source graticule is formed again in the eyepiece.

The offset between the image of the source graticule (36) and the eyepiece graticule (34) is approximately proportional to the distance of the centre of the reflecting sphere so placed and the optical axis of the autocollimating telescope. One may thus visualise the position of a reflecting sphere with respect to the axis of the telescope.

One may thus employ such a telescope for the centreing of the hemisphere (23) in the central portion of the jig as FIG. 7, onto its rear portion (22).

For this purpose, as illustrated in FIG. 9, the central portion (21b) and the rear portion (22) are assembled opposite the objective of the autocollimating telescope (32). A piece of optical fibre (130), the end of which has been carefully prepared, is placed in the cavity (25) in the portion (22) of the jig so that its endface coincides with the face of the portion (22) bearing against the portion (21b).

The autocollimating telescope is centred on the face of the fibre in order to have the image of this face well centred in the eyepiece graticule (34).

One likewise obtains in the eyepiece the image of the source graticule (36) representing the position of the centre of the hollow hemisphere (23).

It is then sufficient to move the portion (21b) by sliding plane-to-plane by means of micro-movements or jarring until the image of the source graticule (36) is brought to the centre of the fibre (13) and of the eyepiece graticule (34).

Thanks to such optical aiming, accuracies of the order of a micrometre may be obtained.

The hemisphere (23) having thus been centred, the jig is completed as illustrated in FIG. 11 with the front portion (21a).

After having employed this jig for centreing a fibre (13) in a male ferrule as described previously for the embodiment as FIG. 3, one proceeds to making the ends of the male ferrule and of the fibre flush and polishing them, either by employing the jig illustrated in FIG. 5 or the jig illustrated in FIG. 12.

This jig (41) includes a body (42) similar to half a female connector and an abutment body, in the present case a hemisphere (43) equipped with a longitudinal bore (44) and aligned in a plane (45) set back a few micrometres, for example, of the order of 3 to 4 micrometres with respect to its centre (46).

After putting the ferrule in place in this jig (41) and polishing it against an abrasive surface, an axial positioning of the fibre with respect to the male ferrule is obtained, similar to that represented in FIG. 6.

The jig represented in FIG. 12 may equally well be employed in a variant upon the method of production of the connector in accordance with the invention, illustrated in FIGS. 13 to 16.

For this purpose a male ferrule is employed such as that illustrated in FIG. 13, including a ferrule body (1') equipped at the end of it with an annular recess having a conical wall (16') the ferrule body (1') including a plurality of radial holes (47) for fitting balls (48) by force.

In the example illustrated, four balls (48) are provided, seated in corresponding holes arranged on the cross.

The ferrule includes in addition an inner tubular part (49), in particular of steel, the end (50) of which corresponds with the protuberance (11) of the embodiment as FIG. 1.

For the production of a connector in accordance with the invention with such male ferrules, a fibre (13) is mounted in the tubular piece (49) by fixing it by gluing.

Then the longitudinal positioning of the end (50) of the piece (49) and of the fibre (13) with respect to the annular conical recess (16') is effected by employing a jig such as that represented in FIG. 12.

For the centreing of the fibre with respect to the male ferrule a jig is employed such as that illustrated in FIG. 15, which includes a body (51) which reproduces the characteristics of half a female connector and a sphere (52) equipped with a longitudinal bore (53), the ferrule mounted in the jig being placed in front of the objective of an autocollimating telescope (32).

The autocollimating telescope is focussed onto the sphere (52) in order that the image of the source graticule (36) representing the sphere should be centred onto the eyepiece graticule (34) as may be seen in FIG. 16.

One obtains simultaneously in the eyepiece the image of the face of the optical fibre (13) out of centre with respect to the eyepiece graticule (34).

One then acts upon the balls (48) as illustrated in FIG. 15 by means of a micrometric device or an impact device (not shown) in the direction of the arrows shown on FIG. 15 in order to correct the position of the fibre contained in the tubular piece (49) with respect to the centre of the sphere (52), the position of definite centreing being obtained when the image of the fibre (13) in the eyepiece becomes centred with respect to the graticules (34 and 36).

Both in this embodiment and in the embodiments previously described, one may proceed to checking each completed male ferrule by employing the autocollimating telescope (32) after having put the ferrule in place in a jig similar to the jig (51), the autocollimating telescope being then focussed onto the face of the fibre: The image of the source graticule which represents the centre of the sphere gives by its position with respect to the eyepiece graticule which may then be graduated, the position of the centre of the sphere with respect to the centre of the fibre, the accuracy being of the order of a micrometer.

Although the invention has been described in connection with particular embodiments, it is quite obvious that it is in no way restricted to them and that numerous variants and modifications may be applied to it without thereby departing from the scope or the spirit of it.

I claim:

1. A connector for optical fibres comprising:
    first and second male ferrules having a passage into which an optical fibre may be introduced and fixed such that an end of the fibre coincides with a tubular axial protuberance formed on an end of said ferrule, said ferrules further including an annular recess having a conical profile, set back from and surrounding said axial protuberance, said recess defining a bearing surface on said ferrules; and
    a female reconstituting connector having a longitudinal bore for supporting and aligning said first and second male ferrules face to face, said female connector including in the central portion of the longitudinal bore a spherical abutment body having an axial orifice passing therethrough for receiving the tubular axial protuberances of the first and second male ferrules, said abutment body further including bearing surfaces for contact with opposing bearing surfaces of the first and second male ferrules;
    wherein the opposing bearing surfaces of the abutment body and the first and second male ferrules are arranged in such a way that at the time of any relative movement of opposing bearing surfaces, the end of the fibre fixed in the axial protuberance is maintained at a constant predetermined distance from the centre of said abutment body.

2. A connector for optical fibres comprising:
    first and second male ferrules having a passage into which an optical fibre may be introduced and fixed such that an end of the fibre coincides with a tubular axial protuberance formed on an end of said ferrule, said ferrules further including an annular recess having a spherical profile set back from and surrounding said axial protuberance, said recess defining a bearing surface on said ferrules; and
    a female reconstituting connector having a longitudinal bore for supporting and aligning said first and second male ferrules face to face, said female connector including in the central portion of the longitudinal bore a cylindrical abutment body having an axial orifice passing therethrough for receiving the tubular axial protuberances of the first and second male ferrules, said abutment body further including bearing surfaces for contact with opposing bearing surfaces of the first and second male ferrules;
    wherein the opposing bearing surfaces of the abutment body and the first and second male ferrules are arranged in such a way that at the time of any relative movement of opposing bearing surfaces, the end of the fibre fixed in the axial protuberance is maintained at a constant predetermined distance from the centre of said abutment body.

3. A method of producing a connector for optical fibres comprising:
    positioning an optical fibre in a first jig which includes an abutment piece having the form of half an abutment body from a female connector;
    centring said fibre in said jig and in a male ferrule;
    fixing said optical fiber in said male ferrule;
    placing said male ferrule in a second jig after the fibre has been fixed, said second jig including an abutment piece having the form of half an abutment body from a female connector; and
    cutting and polishing an end of said fibre and said male ferrule at a predetermined distance from the centre of the abutment piece of said second jig.

4. A method of producing a connector for optical fibres as defined in claim 3 wherein said first jig includes a front portion having the form of half a female connector, a central portion including an abutment piece having the form of half an abutment body from a female connector, and a rear fibre-centring portion which includes a cavity having the shape of a re-entrant dihedron, and wherein said centring step comprises arranging said optical fibre in an axial passage in said ferrule and holding an end of said optical fibre at the bottom of said re-entrant dihedron of said first jig by means of a wedge.

5. A method of producing a connector for optical fibres as defined in claim 3 wherein said fixing step comprises injecting a resin through an orifice formed in the front portion of said first jig.

6. A method of producing a connector for optical fibres as defined in claim 3 wherein said jig comprises a front portion having the form of half a female connector, a central portion including an abutment piece having the form of half an abutment body from a female connector, and a rear fibre-centring portion having a cavity in the shape of a re-entrant dihedron, said method further comprising preadjusting said jig by aligning said central and rear portions of said jig utilizing an autocollimating telescope.

7. A method of producing a connector for optical fibres comprising:
    introducing an optical fibre into a male ferrule;
    securing said optical fibre in said ferrule by a mechanical locking means;
    positioning said male ferrule in a jig which includes an abutment piece having the form of half an abutment body from a female connector;
    cutting and polishing an end of said fibre and said ferrule at a predetermined distance from the center of said abutment piece of said jig;
    positioning said ferrule in a second jig having the form of half a female connector and including an abutment piece having the form of an abutment body from a female connector; and
    centring said optical fibre with respect to said abutment piece by optical aiming utilizing an autocollimating telescope by adjusting the mechanical locking means.

8. A method for producing a connector for optical fibres as defined in claim 7 wherein said mechanical locking means comprises a plurality of metal balls seated in holes in said metal ferrule and a metal tube positioned within said ferrule in which said fibre is fixed, and wherein said centring step comprises applying forces to said metal balls.

* * * * *

UNITED STATES PATENT AND TRADEMARK OFFICE
CERTIFICATE OF CORRECTION

PATENT NO. : 4,869,572          Page 1 of 7

DATED : September 26, 1989

INVENTOR(S) : Despouys

It is certified that error appears in the above-identified patent and that said Letters Patent is hereby corrected as shown below:

Delete the title page and substitute the attached title page.

The sheet of drawings consisting of Figs. 1-16 should be added as shown on the attached sheet.

Signed and Sealed this

Twenty-ninth Day of January, 1991

Attest:

HARRY F. MANBECK, JR.

*Attesting Officer*          *Commissioner of Patents and Trademarks*

United States Patent [19]

Despouys

[11] Patent Number: 4,869,572
[45] Date of Patent: Sep. 26, 1989

[54] CONNECTOR FOR OPTICAL FIBRES AND A METHOD OF PRODUCING IT

[75] Inventor: Jean B. Despouys, Paris, France

[73] Assignee: Radiall Industrie, Rosny-Sous-Bois, France

[21] Appl. No.: 366,707

[22] Filed: Apr. 8, 1982

[30] Foreign Application Priority Data

Apr. 9, 1981 [FR] France .................................. 81 07144

[51] Int. Cl.⁴ .............................................. G02B 6/38
[52] U.S. Cl. ................................................... 350/96.21
[58] Field of Search ........................................ 350/96.21

[56] References Cited

U.S. PATENT DOCUMENTS

| | | | |
|---|---|---|---|
| 3,982,815 | 9/1976 | Nakayama | 350/96 C |
| 4,320,938 | 3/1982 | Gunnerson et al. | 350/96.21 |
| 4,330,171 | 5/1982 | Malsot et al. | 350/96.21 |

FOREIGN PATENT DOCUMENTS

| | | |
|---|---|---|
| 54-1647 | 1/1979 | Japan . |
| 2058392 | 4/1981 | United Kingdom . |

OTHER PUBLICATIONS

Review of Electrical Comm. Laboratories, 418, vol. 27 (1979), Nov., Dec., No. 11–12, "Demountable Connectors for Optical Fiber Transmission Equipment".

Primary Examiner—William L. Sikes
Attorney, Agent, or Firm—Arnold, White & Durkee

[57] ABSTRACT

A connector for optical fibres including two male ferrules mounted at the end of each of the fibres which are to be connected and a female reconstituting connector having a longitudinal bore for supporting and aligning the two ferrules face to face.

The female connector has in the central portion of it inside its longitudinal bore an abutment body for the male connectors, which exhibits an axial orifice passing through it and round the latter a bearing surface opposite each of the male ferrules, each of the male ferrules exhibiting a tubular axial protuberance capable of engaging in the orifice in the said body and a passage into which the optical fibre may be introduce with clearance and sealed in such a way that the end of it coincides with the end of the said protuberance, each of the ferrules including in addition, set back from the said protuberance and surrounding the rear portion of it, an annular recess the wall of which defines a bearing surface for contact with the opposing bearing surface on the body of the female connector.

8 Claims, 5 Drawing Sheets

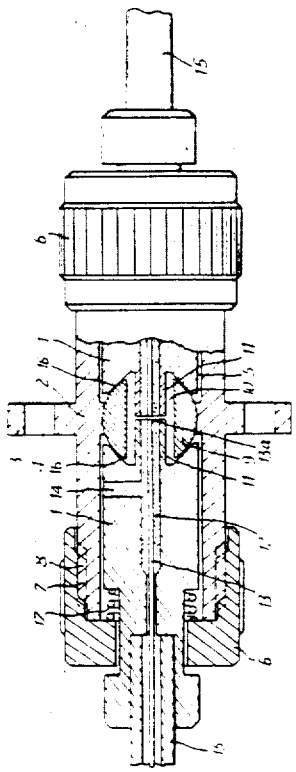

UNITED STATES PATENT AND TRADEMARK OFFICE
CERTIFICATE OF CORRECTION

PATENT NO. : 4,869,572  
DATED : September 26, 1989  
INVENTOR(S) : Despouys

Page 3 of 7

It is certified that error appears in the above-identified patent and that said Letters Patent are hereby corrected as shown below:

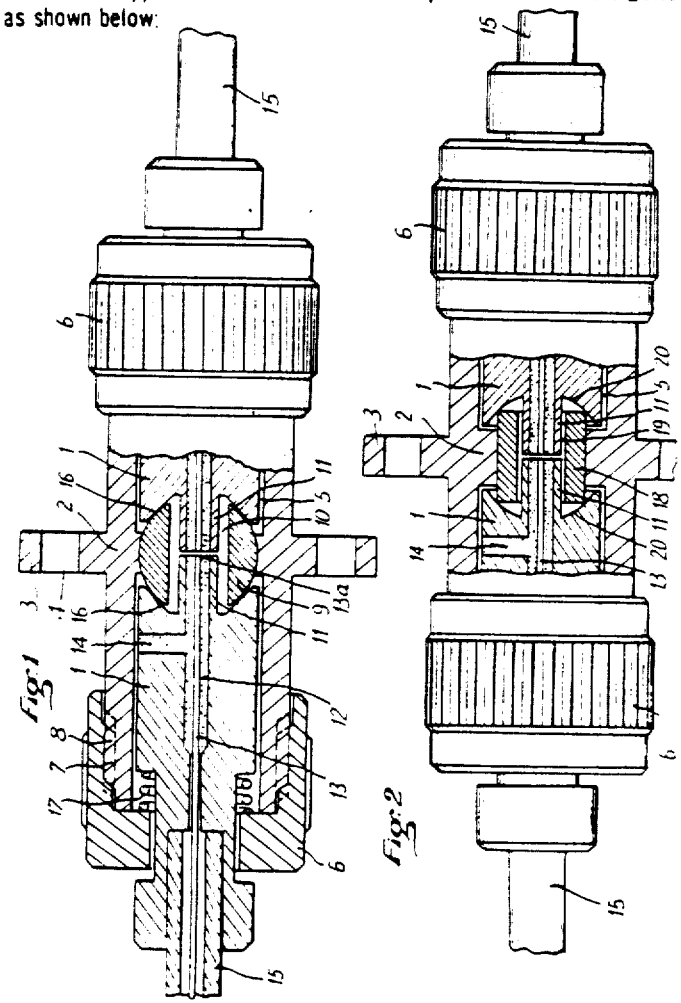

UNITED STATES PATENT AND TRADEMARK OFFICE
CERTIFICATE OF CORRECTION

PATENT NO. : 4,869,572                         Page 4 of 7
DATED      : September 26, 1989
INVENTOR(S): Despouys It is certified that error appears in the above-identified patent and that said Letters Patent are hereby corrected as shown below:

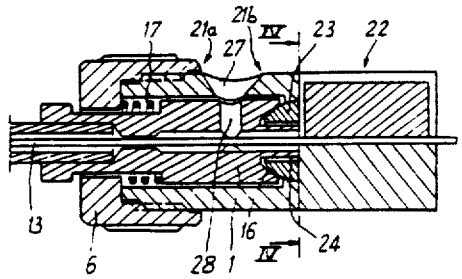

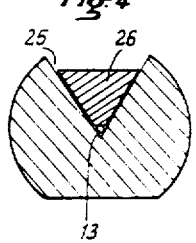

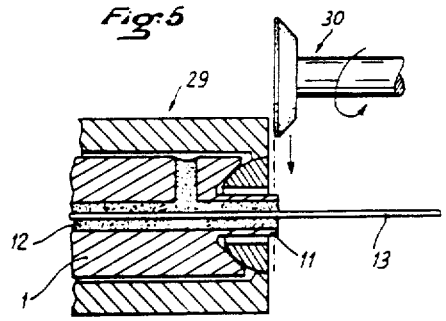

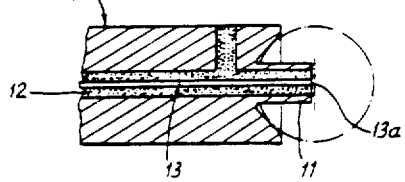

UNITED STATES PATENT AND TRADEMARK OFFICE
CERTIFICATE OF CORRECTION

PATENT NO. : 4,869,572  Page 5 of 7
DATED : September 26, 1989
INVENTOR(S) : Despouys It is certified that error appears in the above-identified patent and that said Letters Patent are hereby corrected as shown below:

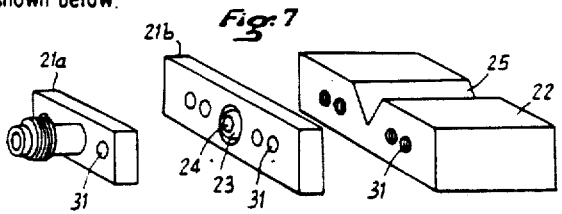

Fig. 7

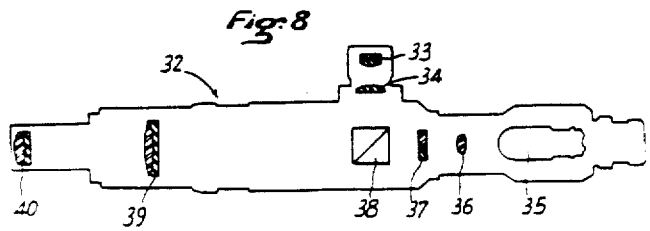

Fig. 8

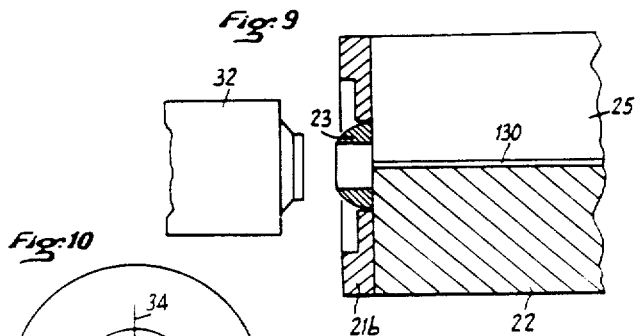

Fig. 9

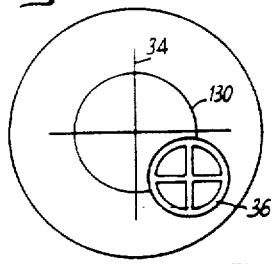

Fig. 10

UNITED STATES PATENT AND TRADEMARK OFFICE
CERTIFICATE OF CORRECTION

PATENT NO. : 4,869,572
DATED : September 26, 1989
INVENTOR(S) : Despouys

It is certified that error appears in the above-identified patent and that said Letters Patent are hereby corrected as shown below:

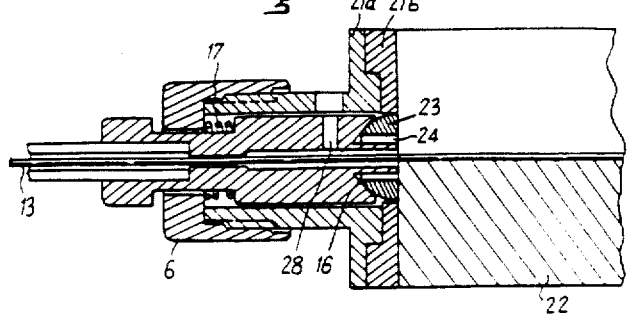

Fig. 11

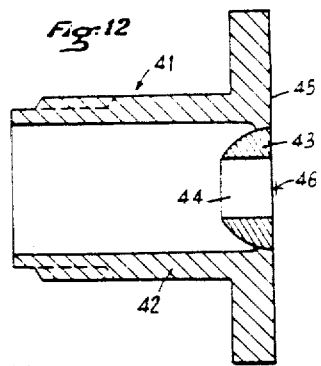

Fig. 12

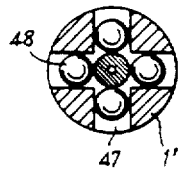

Fig. 14

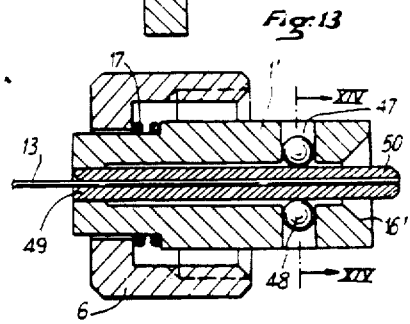

Fig. 13

UNITED STATES PATENT AND TRADEMARK OFFICE
CERTIFICATE OF CORRECTION

PATENT NO. : 4,869,572

DATED : September 26, 1989

INVENTOR(S) : Despouys

It is certified that error appears in the above-identified patent and that said Letters Patent are hereby corrected as shown below:

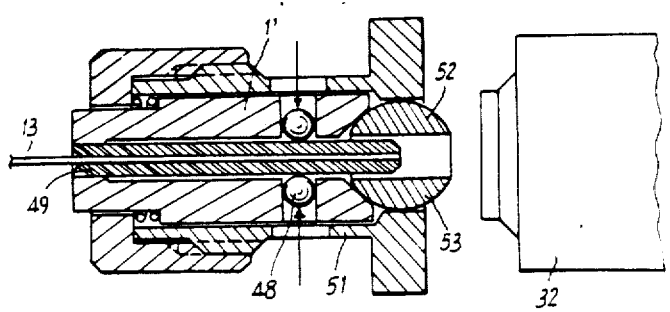

Fig. 15

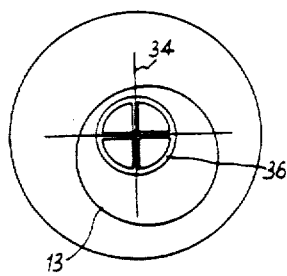

Fig. 16